US008628597B2

(12) United States Patent
Palmgren et al.

(10) Patent No.: US 8,628,597 B2
(45) Date of Patent: Jan. 14, 2014

(54) METHOD OF SORTING ABRASIVE PARTICLES, ABRASIVE PARTICLE DISTRIBUTIONS, AND ABRASIVE ARTICLES INCLUDING THE SAME

(75) Inventors: Gary M. Palmgren, Lake Elmo, MN (US); Brian D. Goers, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 12/491,681

(22) Filed: Jun. 25, 2009

(65) Prior Publication Data

US 2010/0326894 A1 Dec. 30, 2010

(51) Int. Cl.
| | | |
|---|---|---|
| B24D 3/00 | (2006.01) | |
| B24D 11/00 | (2006.01) | |
| B24D 18/00 | (2006.01) | |
| C09K 3/14 | (2006.01) | |
| B24B 1/00 | (2006.01) | |
| B24D 3/02 | (2006.01) | |
| C09C 1/68 | (2006.01) | |

(52) U.S. Cl.
USPC .............................. 51/307; 51/293; 51/306

(58) Field of Classification Search
USPC .............................. 51/307, 293, 306; 149/92
See application file for complete search history.

(56) References Cited

U.S. PATENT DOCUMENTS

| | | | |
|---|---|---|---|
| 2,958,593 | A | 11/1960 | Hoover et al. |
| 3,464,550 | A | 9/1969 | Bieler et al. |
| 3,672,500 | A | 6/1972 | Hayes |
| 4,261,706 | A | 4/1981 | Blanding et al. |
| 4,543,107 | A | 9/1985 | Rue |
| 4,652,274 | A | 3/1987 | Boettcher et al. |
| 4,744,725 | A | 5/1988 | Matarese et al. |
| 4,751,138 | A | 6/1988 | Tumey et al. |
| 4,903,440 | A | 2/1990 | Kirk et al. |
| 4,985,340 | A | 1/1991 | Palazzotto et al. |
| 5,035,723 | A | 7/1991 | Kalinowski et al. |
| 5,086,086 | A | 2/1992 | Brown-Wensley et al. |
| 5,129,919 | A | 7/1992 | Kalinowski et al. |
| 5,152,917 | A | 10/1992 | Pieper et al. |
| 5,236,472 | A | 8/1993 | Kirk et al. |
| 5,254,194 | A | 10/1993 | Ott et al. |

(Continued)

FOREIGN PATENT DOCUMENTS

| | | |
|---|---|---|
| EP | 0 166 676 A2 | 1/1986 |
| EP | 0 480 133 A2 | 4/1992 |

(Continued)

OTHER PUBLICATIONS

Co-pending U.S. Appl. No. 12/337,075, Adefris et al, filed Dec. 17, 2008.

*Primary Examiner* — James McDonough
(74) *Attorney, Agent, or Firm* — Bradford B. Wright

(57) ABSTRACT

A method of making an abrasive particle distribution includes: sorting an initial lot of abrasive particles into a plurality of sublots including first and second sublots of the abrasive particles according to their average particle diameter and aspect ratio, and combining the first and second sublots. The initial lot conforms to an abrasives industry specified nominal grade. The first sublot has an average particle diameter and aspect ratio less than the second sublot. A sum of the first sublot and the second sublot contains fewer abrasive particles than the initial lot. The resultant abrasive particle distribution and abrasive articles including the same are also disclosed.

4 Claims, 6 Drawing Sheets

(56) References Cited

U.S. PATENT DOCUMENTS

| | | | |
|---|---|---|---|
| 5,366,523 A | 11/1994 | Rowenhorst et al. | |
| 5,376,428 A | 12/1994 | Palazzotto et al. | |
| 5,378,251 A | 1/1995 | Culler et al. | |
| 5,385,954 A | 1/1995 | Palazzotto et al. | |
| 5,435,816 A | 7/1995 | Spurgeon et al. | |
| 5,454,844 A | 10/1995 | Hibbard et al. | |
| 5,672,097 A | 9/1997 | Hoopman | |
| 5,672,186 A | 9/1997 | Chesley et al. | |
| 5,681,217 A | 10/1997 | Hoopman et al. | |
| 5,738,696 A | 4/1998 | Wu | |
| 5,738,697 A | 4/1998 | Wu et al. | |
| 5,833,724 A | 11/1998 | Wei et al. | |
| 5,851,247 A | 12/1998 | Stoetze et al. | |
| 5,863,306 A | 1/1999 | Wei et al. | |
| 5,863,308 A | 1/1999 | Qi et al. | |
| 5,908,476 A | 6/1999 | Nishio et al. | |
| 5,928,394 A | 7/1999 | Stoetzel | |
| 5,975,987 A | 11/1999 | Hoopman et al. | |
| 5,975,988 A | 11/1999 | Christianson | |
| 6,039,775 A * | 3/2000 | Ho et al. | 51/295 |
| 6,048,375 A | 4/2000 | Yang et al. | |
| 6,053,956 A | 4/2000 | Wood | |
| 6,123,612 A | 9/2000 | Goers | |
| 6,139,594 A | 10/2000 | Kincaid et al. | |
| 6,228,134 B1 | 5/2001 | Erickson | |
| 6,293,980 B2 | 9/2001 | Wei et al. | |
| 6,368,198 B1 | 4/2002 | Sung et al. | |
| 6,451,077 B1 * | 9/2002 | Rosenflanz | 51/309 |
| 6,599,836 B1 * | 7/2003 | Robinson et al. | 438/691 |
| 6,645,263 B2 * | 11/2003 | Keipert et al. | 51/298 |
| 6,802,878 B1 | 10/2004 | Monroe | |
| 6,949,128 B2 | 9/2005 | Annen | |
| 6,951,509 B1 | 10/2005 | Palmgren | |
| 7,198,553 B2 | 4/2007 | Goers | |
| 7,267,700 B2 | 9/2007 | Collins et al. | |
| 7,297,170 B2 | 11/2007 | Welygan et al. | |
| 7,410,413 B2 | 8/2008 | Woo et al. | |
| 7,553,346 B2 | 6/2009 | Welygan et al. | |
| 7,556,558 B2 | 7/2009 | Palmgren | |
| 2001/0041511 A1 | 11/2001 | Lack et al. | |
| 2003/0009949 A1 | 1/2003 | Prichard et al. | |
| 2003/0022604 A1 | 1/2003 | Annen et al. | |
| 2003/0110706 A1 | 6/2003 | Rosenflanz | |
| 2003/0110709 A1 | 6/2003 | Rosenflanz et al. | |
| 2003/0143938 A1 | 7/2003 | Braunschweig et al. | |
| 2003/0172594 A1 | 9/2003 | Castro et al. | |
| 2005/0060945 A1 | 3/2005 | Culler et al. | |
| 2005/0064805 A1 | 3/2005 | Culler et al. | |
| 2006/0032836 A1 | 2/2006 | Feng et al. | |
| 2006/0112649 A1 | 6/2006 | Feng et al. | |
| 2007/0011952 A1 * | 1/2007 | Fang et al. | 51/308 |
| 2007/0072527 A1 * | 3/2007 | Palmgren | 451/540 |
| 2007/0074456 A1 | 4/2007 | Orlhac et al. | |
| 2007/0084133 A1 | 4/2007 | Schwabel et al. | |
| 2007/0151166 A1 | 7/2007 | Endres et al. | |
| 2007/0243798 A1 | 10/2007 | Annen et al. | |
| 2008/0102735 A1 * | 5/2008 | Bakshi et al. | 451/36 |
| 2009/0017727 A1 | 1/2009 | Pribyl et al. | |

FOREIGN PATENT DOCUMENTS

| | | |
|---|---|---|
| EP | 1 800 801 A2 | 6/2007 |
| WO | WO 87/07187 | 12/1987 |
| WO | WO 95/03370 | 2/1995 |
| WO | WO 99/38817 | 8/1999 |
| WO | WO 01/23320 A1 | 4/2001 |
| WO | WO 02/32832 A1 | 4/2002 |
| WO | WO 2008/079932 A2 | 7/2008 |

* cited by examiner

METHOD OF SORTING ABRASIVE PARTICLES, ABRASIVE PARTICLE DISTRIBUTIONS, AND ABRASIVE ARTICLES INCLUDING THE SAME

TECHNICAL FIELD

The present disclosure broadly relates to abrasive particles and abrasive articles including them.

BACKGROUND

Particle sizing in the abrasives industry is typically accomplished by passing abrasive particles through screens of different sizes resulting abrasive particles falling within an abrasives industry accepted specified nominal grade. Typical screening practices use vibration to speed up the screening process. While screening removes undesirably large and small particles, particles of varying shapes pass through the screen depending upon particle orientation. For example, a long narrow particle may be held up on a screen or may pass through the same screen depending on orientation. Thus, while abrasive particles are supplied according to particle size, the shape of the particles typically is not controlled.

Abrasive particles can be sorted by shape using various techniques (e.g., a vibratory shape sorting table) as is known in the abrasives industry. Such vibratory shape sorting tables are commonly used to remove extremes of the shape distribution within a lot of abrasive particles. These vibratory tables generally can be used to separate odd-shaped particles from a lot of abrasive grains of the same size range (e.g., ranging from nearly ideal crystals or cubo-octahedral shapes to broken particles having irregular shapes or high aspect ratio needle-like particles or platelets) using an inclined vibrating tray. Shape sorting is generally independent of particle size.

In abrasive grinding, the properties of the abrasives and their response to impact loading play a significant role in determining the results achievable. Commercially available abrasive particles are typically classified by size and optionally friability and/or crush strength. Within a particular size range, there is typically a range of particle shapes, generally ranging from lower aspect ratio to higher aspect ratio. However, with many high aspect ratio abrasive particle distributions, the platy/angular nature of the abrasive particles causes the particles to orient in irregular detrimental ways (e.g., laying down or oriented at odd angles) during incorporation into abrasive articles.

Many types of abrasive articles are known. Generally, abrasive articles include abrasive particles. The abrasive particles are usually retained in a binder matrix and optionally attached to a substrate such as, for example a backing or a metallic disc.

SUMMARY

The present inventors have discovered that by simultaneously controlling the average particle diameters and aspect ratios of the abrasive particles within a given size range it is possible to precisely manipulate the aggressiveness, and hence the performance, of the abrasive particles. Abrasive particle distributions made according to the present disclosure are useful; for example, for tailoring the performance of abrasive articles to their intended application.

Accordingly, in one aspect, the present disclosure provides a method of making an abrasive particle distribution, the method comprising:

providing an initial lot of abrasive particles sorted into a plurality of sublots of the abrasive particles according to their average particle diameter and aspect ratio, wherein the initial lot conforms to an abrasives industry specified nominal grade, and wherein the plurality of sublots comprises:
  a first sublot of the abrasive particles having a first distribution average particle diameter and a first average aspect ratio; and
  a second sublot of the abrasive particles having a second distribution average particle diameter and a second average aspect ratio, wherein the first distribution average particle diameter is less than the second distribution average particle diameter, and wherein the first average aspect ratio is less than the second average aspect ratio; and
combining at least a portion of the first sublot with at least a portion of the second sublot, wherein a sum of said at least a portion of the first sublot and said at least a portion of the second sublot contains fewer of the abrasive particles than the initial lot.

In some embodiments, a weight ratio of said at least a portion of the first sublot to said at least a portion of the second sublot is at least 9:1. In some embodiments, the abrasive particles are diamonds. In some embodiments, the first sublot and the second sublot taken together comprise less than 40 percent by weight of said plurality of abrasive particles.

In yet another aspect, the present disclosure provides an engineered abrasive particle distribution preparable, or prepared, according to a method of the present disclosure.

In yet another aspect, the present disclosure provides an abrasive article comprising an abrasive particle distribution according to the present disclosure. In yet another aspect, the present disclosure provides an abrasive particle distribution comprising a plurality of abrasive particles having a distribution average particle diameter and conforming to an abrasives industry specified nominal grade, wherein, for the abrasive particles having an average particle diameter greater than or equal to the distribution average particle diameter, a linear least squares regression (i.e., linear least squares analysis) of the aspect ratio with respect to the average particle diameter has a positive slope.

In some embodiments, including all the abrasive particles in the abrasive particle distribution, a linear least squares regression of the aspect ratio with respect to the average particle diameter has a positive slope.

In some embodiments, the plurality of abrasive particles is secured to a substrate. In some embodiments, the plurality of abrasive particles are brazed, electroplated, infiltrated, sintered, chemically bonded, metallurgically bonded, or adhesively bonded. In some embodiments, the abrasive article comprises a chemical mechanical planarization pad conditioner. In some embodiments, the abrasive article is selected from the group consisting of saw blades, wire saws, dressing wheels, cutoff wheels, and grinding wheels.

The inventive process of the present disclosure provides abrasive particle distributions wherein the fraction of larger, high aspect ratio particles is enhanced relative to smaller blockier abrasive particles. When incorporated into abrasive articles, the inventive abrasive particle distributions may result in improved cut rate, longer life, and/or reduced wild scratches relative to commercially available abrasive particle of abrasives industry specified nominal grade are used.

Without wishing to be bound by theory, the present inventors believe that larger, higher aspect ratio particles in a given abrasive particle distribution, which typically comprise less than about 10 weight percent, more typically less than about 5 weight percent, of the abrasive particles are responsible for a majority of observed abrasive performance. The present inventors further believe that sharper particles (higher aspect ratio particles) are believed to generally produce longer life and higher cut rate performance compared to blockier particles. The present inventors further believe that the remainder of the abrasive particles in the distribution contribute to abrasive performance by adjusting the aggressiveness of the larger particles; for example, by controlling the cut depth of the larger, sharper abrasive particles.

As used herein, the term "distribution average particle diameter" ($D_{Dist}$) refers to the average particle diameter over all abrasive particles in the distribution. This differs from the term "average particle diameter" which refers to the particle diameter of individual particles as may be determined, for example, by various analytical methods.

DETAILED DESCRIPTION

Figure 1:
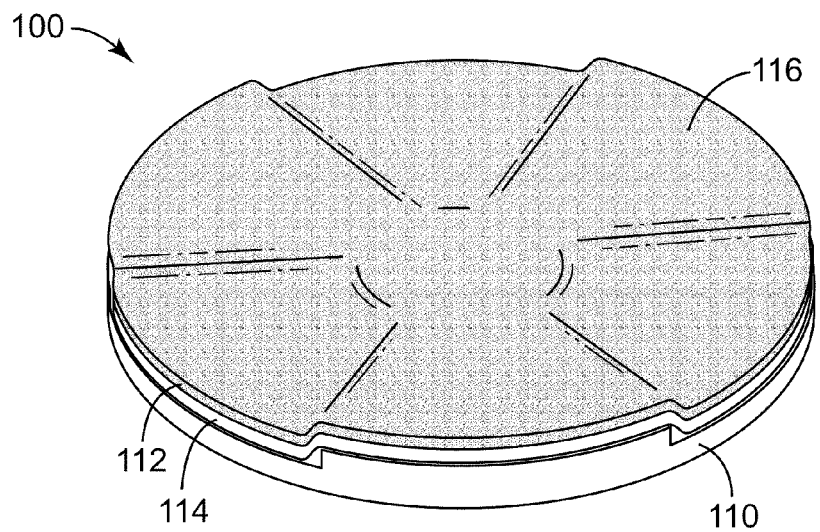
FIG. 1 perspective view of an exemplary pad conditioner 100 made according to one embodiment of the present disclosure.

The method of the present disclosure involves providing an initial lot of abrasive particles sorted into a plurality of sublots of the abrasive particles according to their average particle diameter and aspect ratio. This may be accomplished, for example, by sorting one original lot by average particle diameter and aspect ratio, or by obtaining abrasive particles with two different size grades and sorting each one by aspect ratio. Other methods leading to a plurality of sublots of the abrasive particles according to their size and aspect ratio may also be used.

The abrasive particles of the initial lot may have any average particle diameter, but typically range in average particle diameter from about 0.1 to about 5000 micrometers, more typically from about 1 to about 2000 micrometers; desirably from about 5 to about 1500 micrometers, and more desirably from about 100 to about 1500 micrometers.

The initial lot of abrasive particles is graded according to abrasive industry accepted grading standards that specify the particle size distribution for each nominal grade within numerical limits. Such industry accepted grading standards (i.e., specified nominal grades) include, for example, those known as the American National Standards Institute, Inc. (ANSI) standards, Federation of European Producers of Abrasive Products (FEPA) standards, and Japanese Industrial Standard (JIS) standards. Exemplary ANSI grade designations (i.e., specified nominal grades) include U.S. Grit Sizes 8/10, 10/12, 12/14, 14/16, 16/18, 18/20, 20/25, 20/30, 25/30, 30/35, 30/40, 35/40, 40/45, 40/50, 45/50, 50/60, 60/70, 60/80, 70/80, 80/100, 100/120, 120/140, 140/170, 170/200, 200/230, 230/270, 270/325, and 325/400. Exemplary FEPA grade designations include: "D"-grades such as, e.g., D252, D181, D151, D126, D107, D91, D76, D64, D54, and D46; "B"-grades such as, e.g., B252, B181, B151, B126, B107, B91, B76, B64, B54, and B46; "F"-grades such as, e.g., F2000, F1200, F1000, F600, F360, F220, F100, F60, F36, F20, and F12; and "P"-grades such as, e.g., P8, P12, P16, P24, P36, P40, P50, P60, P80, P100, P120, P150, P180, P220, P320, P400, P500, P600, P800, P1000, and P1200. Exemplary JIS grade designations include JIS 8, JIS 12, JIS 20, JIS 30, JIS 35, JIS 40, JIS 50, JIS 60, JIS 80, JIS 100, JIS 120, JIS 140, JIS 170, JIS 200, JIS 220, JIS 230, JIS 270, JIS 325, JIS 1000, JIS 1500, JIS 2500, JIS 4000, JIS 6000, JIS 8000, and JIS 10000.

The abrasive particles may be of any type. Typically, the abrasive particles have a Mohs hardness of at least 4, more typically at least 6 or even at least 8. Exemplary abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride (CBN), boron carbide, garnet, flint, emery, sol-gel derived abrasive particles, or a mixture thereof. More typically, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, precisely-shaped abrasive particles, agglomerate abrasive particles, or a mixture thereof. The abrasive particles may be in the form of, for example, individual particles, abrasive composite particles, and agglomerates (including erodible agglomerates).

The initial lot is sorted according to average particle diameter and aspect ratio. The sorting may be in either order, but is generally sequential. For example, an initial lot may be sorted by average particle diameter into a plurality of fractions (e.g., 2, 3, 5, 10, or more fractions), and then each fraction is sorted by aspect ratio. In another embodiment, the initial lot may be sorted by aspect ratio into a plurality of fractions (e.g., 2, 3, 5, 10, or more fractions), and then each fraction is sorted by average particle diameter. In yet another embodiment, different size grades (graded by average particle diameter) of the abrasive particles may be obtained, then each size grade sorted according to aspect ratio. Regardless of the particular method, the end result amounts to a two-dimensional matrix of abrasive particle fractions sorted according to average particle diameter and aspect ratio. In either case, the end result is a plurality of fractions (typically many), termed sublots, that have been twice sorted (i.e., by average particle diameter and aspect ratio). The number of sublots will necessarily be at least four, but is typically larger. For example, the number of sublots may be 6, 10, 15, 20, 25, 36, 56, or more. Accordingly, combining the first sublot and the second sublot results in a plurality of abrasive particles that has less than the number of abrasive particles in the initial lot. For example, the combined first and second lots may contain less than about 40, 30, 20, or even 10 percent by weight of the initial lot, although other amounts may also be used.

Aspect ratio and average particle diameter may be readily determined by those of skill in the art, for example, using optical microscopy optionally aided by image analysis software such as, for example, IMAGE-PRO PLUS image analysis software marketed by Media Cybernetic LP of Silver Spring, Md.

The aspect ratio of abrasive particles can be measured, for example, by optical microscopy and image analysis, typically aided by computer. For example, two-dimensional silhouettes of a representative sample of a quantity of abrasive particles can be used with image analysis to characterize that quantity of abrasive particles according to aspect ratio. The term "aspect ratio" is generally known in the art of abrasive particles and refers to the ratio of length to width, or length to cross-section (e.g., diameter), or the largest cross-sectional dimension to the smallest cross-sectional dimension when increasingly irregular particles are at issue. In addition, image analysis can be used to fit an elliptical shape to the silhouette of a particle and then report the ratio of the major axis to the minor axis of the fitted elliptical shape as the aspect ratio.

The first sublot and the second sublot of the abrasive particles are selected from among the totality of the sublot such that the first distribution average particle diameter is less than the second distribution average particle diameter, and that the first average aspect ratio is less than the second average aspect ratio. The choice of which sublots to use may be influenced not only by average particle diameter and aspect ratio, but by relative abundance as well.

Any weight ratio of the first and second lots may be used; for example, depending on the particular abrasive properties desired. However, for typical abrading applications employing a fixed abrasive article, the weight ratio of the first sublot to the second sublot is at typically at least 8:1, more typically at least 9:1, and more typically at least about 95:5.

Aspect ratio can be controlled using a vibratory shape sorting table along with particle analysis and selection. Such vibratory shape sorting tables include, for example, an inclined oscillating table as available from Vollstaedt Diamant GmbH of Berlin, Germany. Other useful sorting devices can be found, for example, in U.S. Pat. No. 3,672,500 (Hayes) and U.S. Pat. No. 3,464,550 (Bieler et al.) and WO 87/07187 (Donecker).

Various average particle diameter sorting (e.g., size classification) methods may be used such as, for example, dry screening, air cycloning, hydrocycloning, sedimentation, and air classifying as is known in the abrasives art. Dry screening using successively finer sieves (e.g., for grains larger than 325 mesh) is typically desirable due to its efficiency and process flexibility.

Various distributions of abrasive particles may be prepared according to the method of the present disclosure. In one such distribution the abrasive particles have a distribution average particle diameter conforming to an abrasives industry specified nominal grade. For those abrasive particles in the distribution that have an average particle diameter greater than or equal to the distribution average particle diameter, a plot of the aspect ratio with respect to the average particle diameter those, has a positive slope. This contrasts with typical abrasive particle distributions, which generally have a negative slope. Hence, abrasive particle distributions according to the present disclosure are skewed toward higher amounts of larger, sharper abrasive particles.

Abrasive particle distributions according to the present disclosure are useful, for example, in various abrasive articles including, for example, bonded abrasive articles, sintered abrasive articles, coated abrasive articles, nonwoven abrasive articles, saw blades, wire saws, dressing wheels, cutoff wheels, and grinding wheels. Details regarding coated abrasive articles can be found, for example, in U.S. Pat. No. 5,152,917 (Pieper et al.); U.S. Pat. No. 5,378,251 (Culler et al.); and U.S. Pat. No. 5,975,988 (Christianson). Details regarding bonded abrasive articles can be found, for example, in U.S. Pat. No. 4,543,107 (Rue) and U.S. Pat. No. 5,863,308 (Qi et al.). Details regarding nonwoven abrasive articles can be found, for example, in U.S. Pat. No. 2,958,593 (Hoover et al.).

In many cases, the abrasive particles are secured to a substrate. Exemplary useful substrates include treated and untreated papers and fabrics (e.g., nonwoven fabrics and woven fabrics), polymer films, and metallic substrates. The abrasive particles may be secured to the substrate by any suitable process such as, e.g., brazing, electroplating, infiltration, sintering, chemical bonding, metallurgical bonding, or adhesive bonding.

In some embodiments, the abrasive article is selected from the group consisting of saw blades, wire saws, dressing wheels, cutoff wheels, and grinding wheels.

In some embodiments, the abrasive article comprises a chemical mechanical planarization (CMP) pad conditioner. One embodiment of a CMP pad conditioner is described in U.S. Pat. No. 6,951,509 (Palmgren). Referring now to FIG. 1, exemplary CMP pad conditioner 100 includes undulating disk 110, substrate 114, and abrasive layer 112. Abrasive layer 112 has abrasive surface 116. Abrasive layer 112 can be constructed to include a backing (not shown) with an abrasive surface 116 affixed onto the backing. If abrasive layer 112 is constructed with a backing then the need for substrate 114 may be eliminated. Abrasive surface 116 is a textured surface suitable for conditioning a polishing pad. For example, abrasive surface 116 can include abrasive particles and a matrix material, such as described in U.S. Pat. No. 6,123,612 (Goers). In another embodiment, the CMP pad has a substantially planar structure as described in FIGS. 1-3 of U.S. Pat. No. 7,198,553 (Goers).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Example 1

Two lots of diamond, of differing size, were used to make a diamond distribution of the present disclosure. The first lot, PDA446 7080 D213 (from Element Six, Ltd., New York, N.Y.), was a 70/80 mesh diamond with an average diameter of about 213 microns (μm). The second lot, PDA446 80100 D181 (from Element Six, Ltd), was an 80/100 mesh diamond with an average diameter of about 181 μm. Prior to combining diamonds from the two lots, a shape sorting table of the type available from Vibro Techniques of Mumbai, India was used to separate each of the two lots of diamond into 10 sequential bins containing progressively higher aspect ratio diamond particles, i.e., the diamonds in bin 1 are expected to have the lowest aspect ratio while the diamonds in bin 10 are expected to have the highest aspect ratio. PDA446 80100 D181 diamonds from bin 1 were further sieved through an 80 mesh sieve. Diamonds that passed through the sieve were used to make the desired distribution of diamonds. PDA446 7080 D213 diamonds from bin 7 were also further sieved through an 80 mesh sieve. The diamonds that were retained on the sieve were used to make the desired distribution of diamonds. Diamonds, 0.92 g from PDA446 80100 D181 from bin 1, further sieved as described above, were combined and mixed with 0.39 g of PDA446 7080 D213 diamonds from bin 7, further sieved as described above, forming Abrasive Particle Distribution A (APDA).

The average particle diameter and aspect ratio of a representative sample of diamonds from lot PDA446 80100 D181 (as received), lot PDA446 7080 D213 (as received) and APDA were measured using optical microscopy in combination with ImagePro image analysis software from Media Cybernetics LP of Silver Spring, Md. Measurements were made as follows. A representative sample of diamonds was placed on a glass slide in an orderly array, placed on the viewing stage of an optical microscope, digital images were taken followed by image analysis of diamond size and shape, using the ImagePro image analysis software. The diameter of an individual diamond particle was measured as the length through the centroid, $D_i$, of a diamond, length measurements being made every two degrees of rotation around the centroid. The average diameter of an individual diamond particle, $D_{avg}$, was taken as the average of these lengths, $D_i$. The diamond particle aspect ratio was calculated as the ratio of the maximum feret length divided by the minimum diameter length passing through the centroid. The average diamond diameter of a distribution of diamond particles, $D_{Dist}$, was calculated as the sum of the average diamond diameter of the individual diamond particles, $D_{avg}$, making up the distribution divided by the number of diamond particles making up the distribution.

Figure 2:
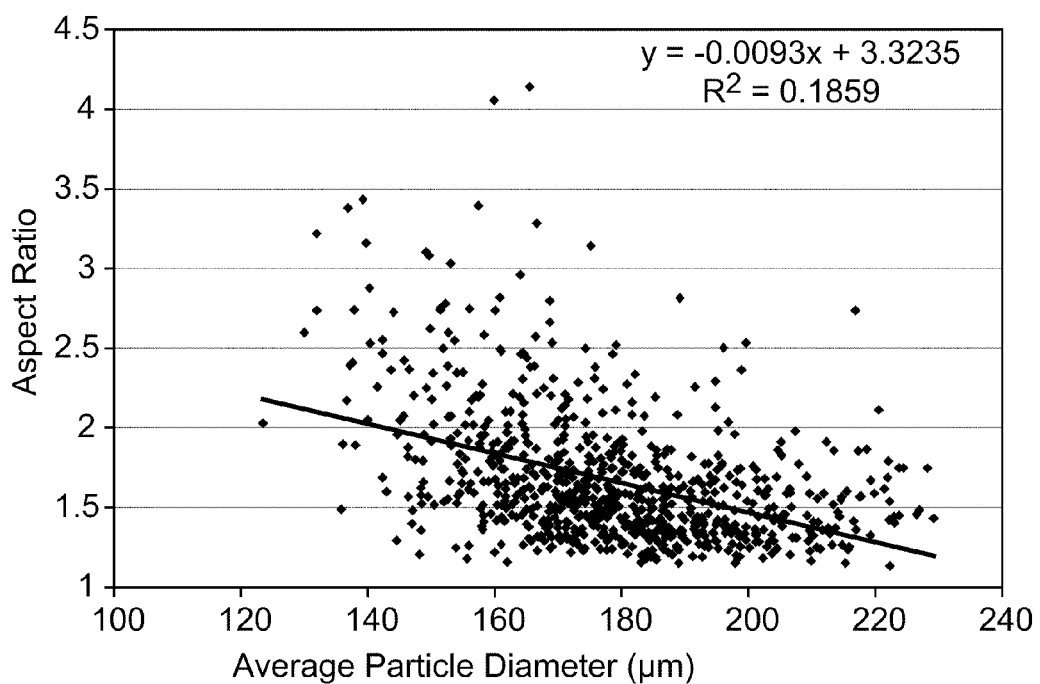
FIG. 2 is a scatter plot of aspect ratio versus average particle diameter for the PDA446 80100 D181 diamond lot as received.
Figure 3:
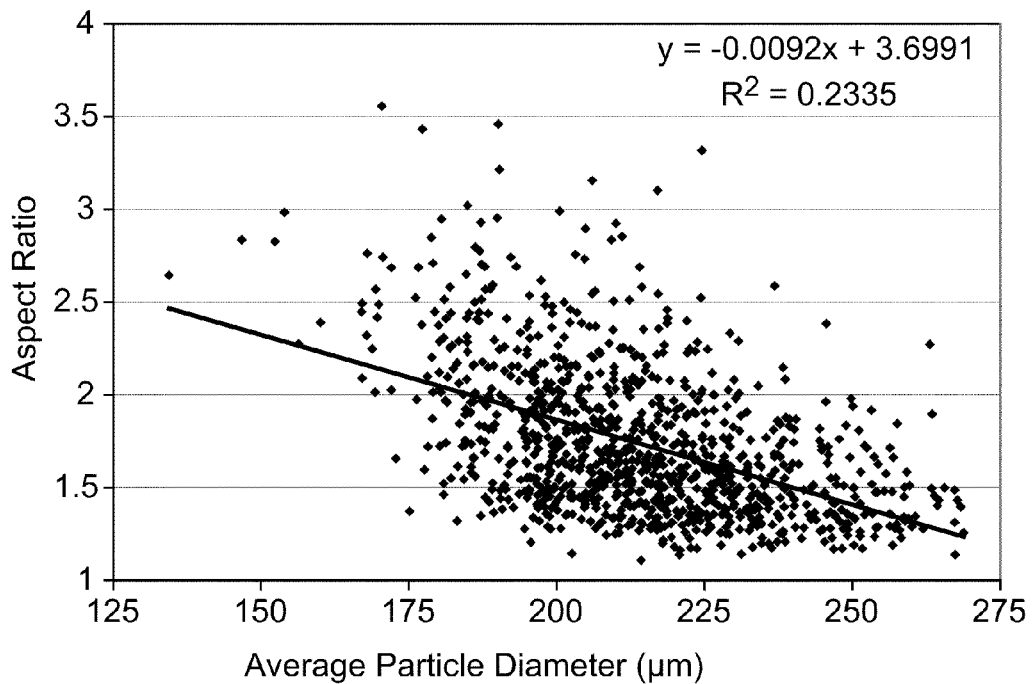
FIG. 3 is a scatter plot of aspect ratio versus average particle diameter for the PDA446 7080 D213 diamond lot as received.
Figure 4:
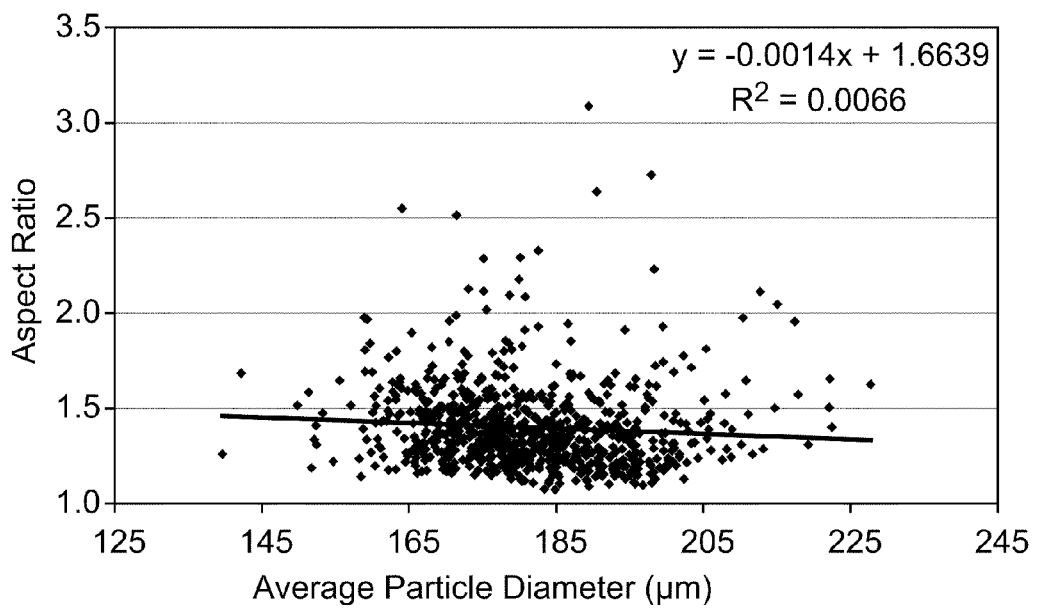
FIG. 4 is a scatter plot of aspect ratio versus average particle diameter for Abrasive Particle Distribution A produced in Example 1.
Figure 5:
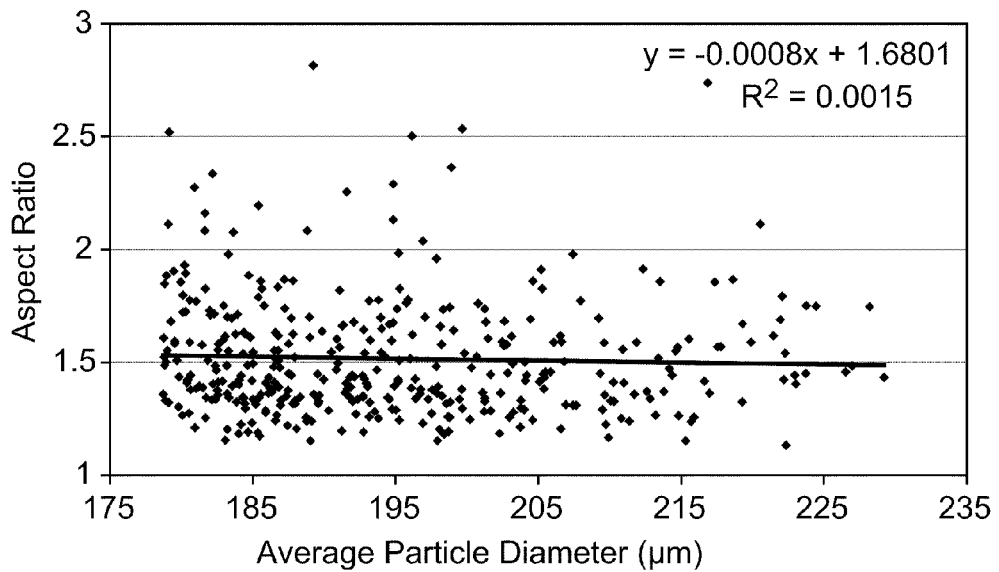
FIG. 5 is a scatter plot of aspect ratio versus average particle diameter for the PDA446 80100 D181 diamond lot as received, except all of the diamonds having a $D_{avg}$ below the $D_{Dist}$ were removed from the distribution.
Figure 6:
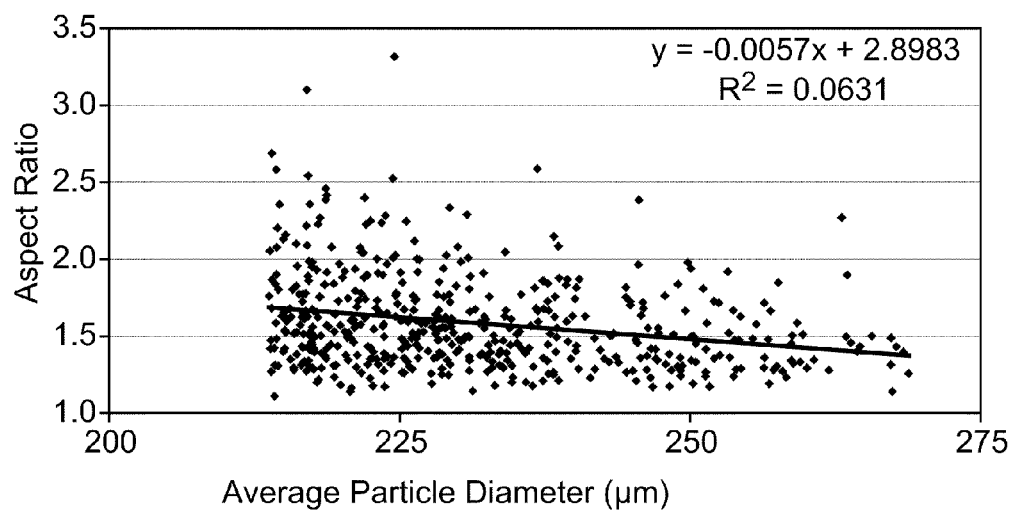
FIG. 6 is a scatter plot of aspect ratio versus average particle diameter for the PDA446 7080 D213 diamond lot as received, except all of the diamonds having a $D_{avg}$ below the $D_{Dist}$ were removed from the distribution.
Figure 7:
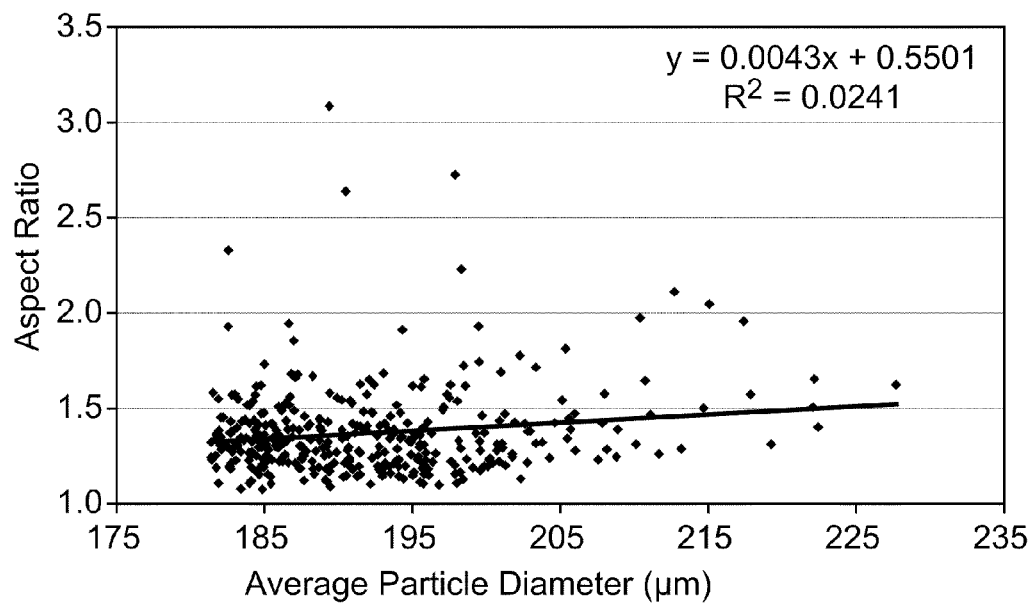
FIG. 7 is a scatter plot of aspect ratio versus average particle diameter for Abrasive Particle Distribution A produced in Example 1, except all of the diamonds having a $D_{avg}$ below the $D_{Dist}$ were removed from the distribution.

Graphs of the aspect ratio vs. average particle diameter for diamond lot PDA446 80100 D181 (as received), lot PDA446 7080 D213 (as received) and APDA are shown in FIG. 2, FIG. 3 and FIG. 4, respectively. Similar graphs were made for the same series of diamond distributions, except all of the diamonds having an average particle diameter, $D_{avg}$, below the average diameter of the distribution, $D_{Dist}$, were removed from the distributions. These graphs for diamond lot PDA446 80100 D181 (as received), lot PDA446 7080 D213 (as received) and APDA, are shown in FIG. 5, FIG. 6 and FIG. 7, respectively. The corresponding slope, intercept, and correlation coefficient values related to a linear least squares regression, of the data shown in each of the graphs is also displayed in FIGS. 2-7.

Example 2

Two lots of diamond, of differing size, were used to make a diamond distribution of the present disclosure. The first lot, PDA087 100120 D151 (from Element Six, Ltd.), was a 100/120 mesh diamond with an average diameter of about 151 μm. The second lot was PDA446 80100 D181 (from Element Six, Ltd.). A shape sorting table was used to separate each of the two lots of diamond into 10 sequential bins containing progressively higher aspect ratio diamond particles. Diamonds, 0.50 g from PDA087 100120 D151 from bin 1 were combined and mixed with 0.50 g of PDA446 80100 D181 diamonds from bin 7, forming Abrasive Particle Distribution B (APDB).

Figure 8:
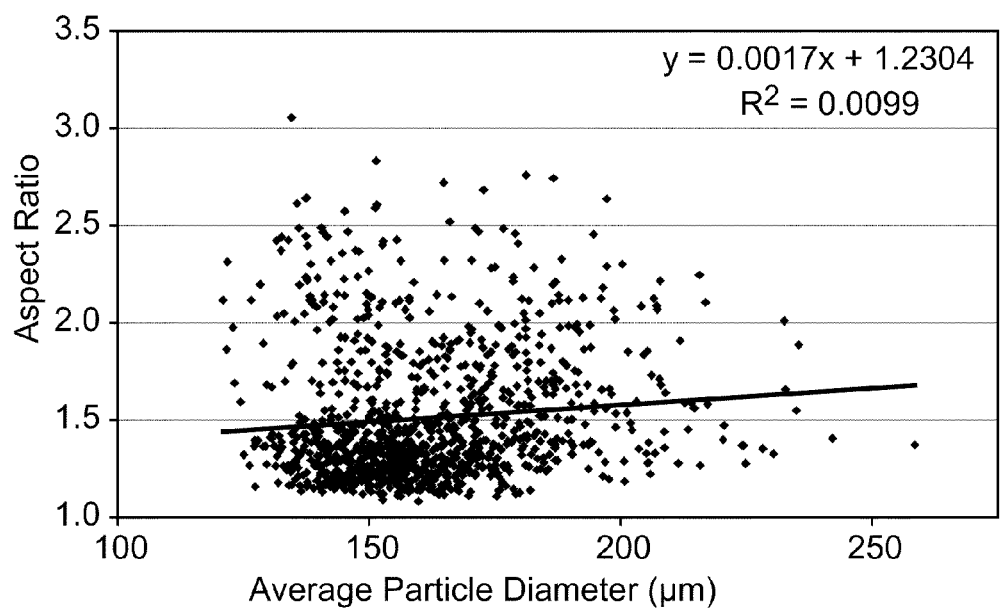
FIG. 8 is a scatter plot of aspect ratio versus average particle diameter for Abrasive Particle Distribution A produced in Example 2.
Figure 9:
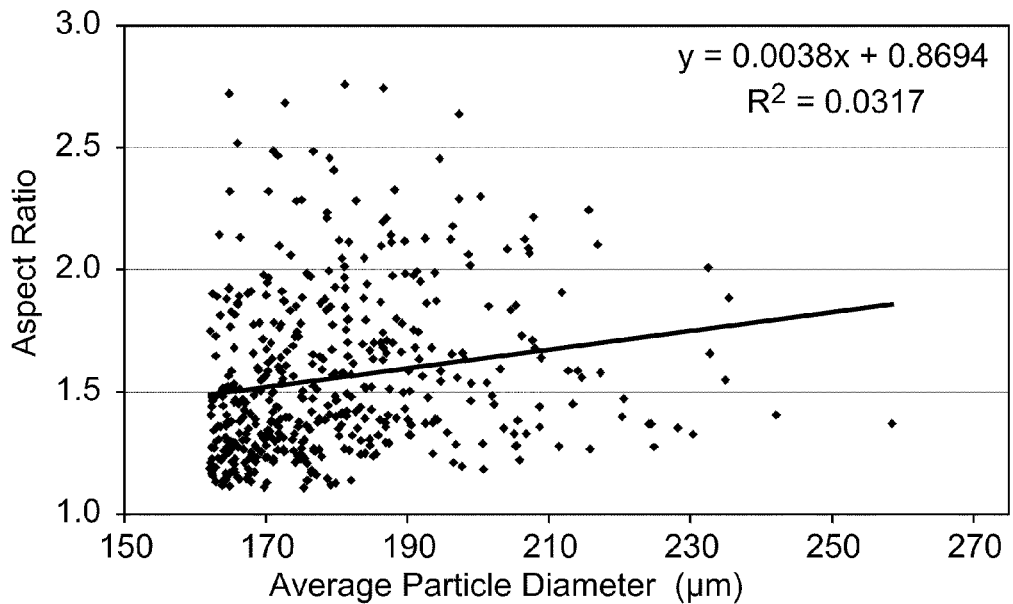
FIG. 9 is a scatter plot of aspect ratio versus average particle diameter for Abrasive Particle Distribution B produced in Example 2, except all of the diamonds having a $D_{avg}$ below the $D_{Dist}$ were removed from the distribution.

A graph of the aspect ratio vs. average particle diameter for APDB is shown in FIG. 8. A similar graph was made for APDB, except all of the diamonds having an average particle diameter, $D_{avg}$, below the average diameter of the distribution, $D_{Dist}$, were removed from the distribution. This data is shown in FIG. 9.

Figure 10:
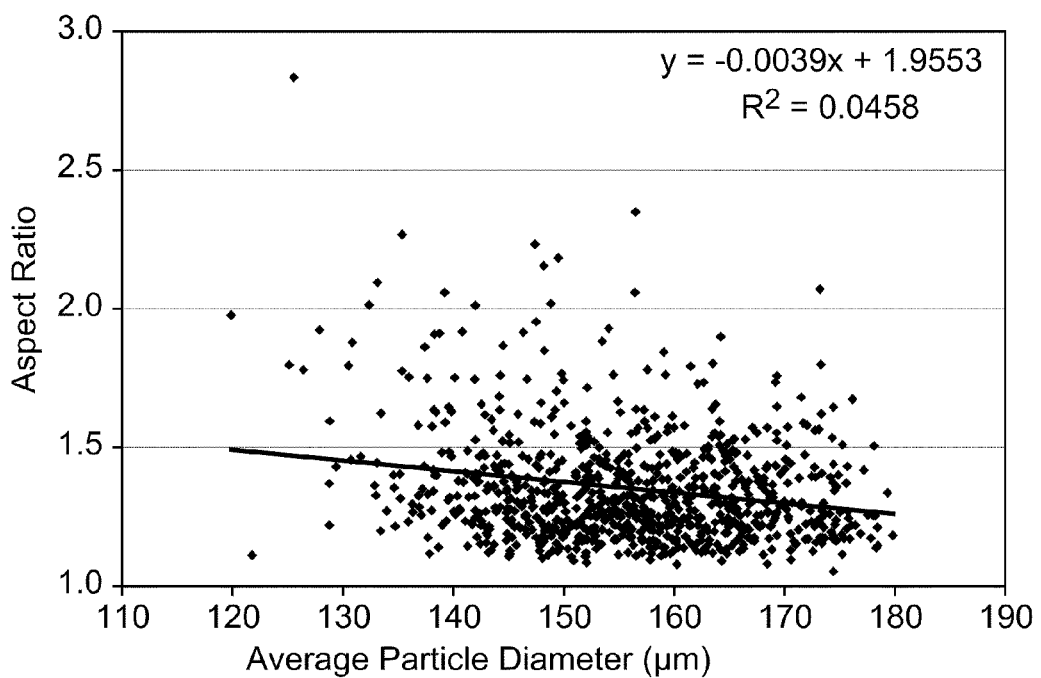
FIG. 10 is a scatter plot of aspect ratio versus average particle diameter for the PDA087 100120 D151 diamond lot as received.
Figure 11:
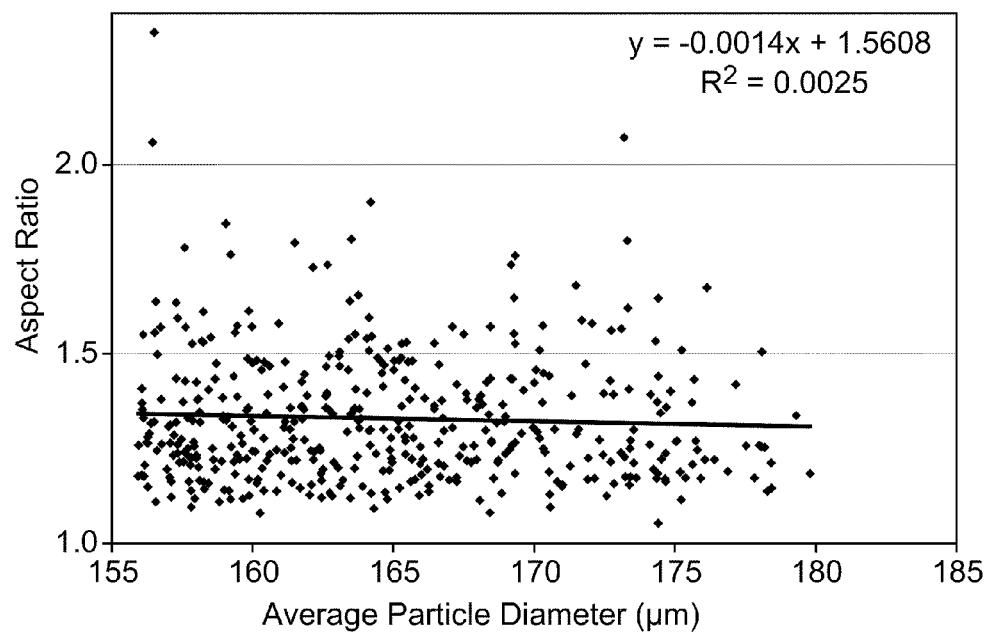
FIG. 11 is a scatter plot of aspect ratio versus average particle diameter for the PDA087 100120 D151 diamond lot as received, except all of the diamonds having a $D_{avg}$ below the $D_{Dist}$ were removed from the distribution.

FIGS. 10 and 11 show similar data for the PDA087 100120 D151 (as received) for both the full distribution of particles and the truncated distribution, removing particles having a $D_{avg}$ less than $D_{Dist}$. The corresponding slope, intercept and correlation coefficient values related to a linear least squares analysis of the data shown in each of the graphs is also displayed in FIGS. 8-11.

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of making an abrasive particle distribution, the method comprising:
providing an initial lot of abrasive particles, and sorting the initial lot of abrasive particles into a plurality of sublots of the abrasive particles according to their average particle diameter and aspect ratio, wherein the initial lot conforms to an abrasives industry specified nominal grade, and wherein the plurality of sublots comprises:
a first sublot of the abrasive particles having a first distribution average particle diameter and a first average aspect ratio; and
a second sublot of the abrasive particles having a second distribution average particle diameter and a second average aspect ratio, wherein the first distribution average particle diameter is less than the second distribution average particle diameter, and wherein the first average aspect ratio is less than the second average aspect ratio; and
combining at least a portion of the first sublot with at least a portion of the second sublot, wherein a sum of said at least a portion of the first sublot and said at least a portion of the second sublot contains fewer of the abrasive particles than the initial lot.

2. The method of claim 1, wherein a weight ratio of said at least a portion of the first sublot to said at least a portion of the second sublot is at least 9:1.

3. The method of claim 1, wherein the abrasive particles are diamonds.

4. The method of claim 1, wherein the first sublot and the second sublot taken together comprise less than 40 percent by weight of the initial lot.

* * * * *